United States Patent
Sugo et al.

(10) Patent No.: US 7,434,647 B2
(45) Date of Patent: Oct. 14, 2008

(54) DRIVING FORCE CONTROL APPARATUS FOR FOUR-WHEEL DRIVE VEHICLE

(75) Inventors: Yasuhiko Sugo, Saitama-ken (JP); Jiro Hara, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 463 days.

(21) Appl. No.: 11/206,954

(22) Filed: Aug. 19, 2005

(65) Prior Publication Data
US 2006/0037804 A1 Feb. 23, 2006

(30) Foreign Application Priority Data
Aug. 23, 2004 (JP) .............................. 2004-242287

(51) Int. Cl.
*B60K 17/35* (2006.01)
(52) U.S. Cl. ........................................ 180/249; 701/90
(58) Field of Classification Search ................ 180/248, 180/233, 247, 249; 701/82, 90
See application file for complete search history.

(56) References Cited

U.S. PATENT DOCUMENTS

| | | | |
|---|---|---|---|
| 4,773,517 A | | 9/1988 | Watanabe |
| 5,010,974 A | | 4/1991 | Matsuda |
| 5,701,247 A | * | 12/1997 | Sasaki ........................... 701/1 |
| 5,947,224 A | | 9/1999 | Kouno |
| 6,493,623 B2 | * | 12/2002 | Nishida et al. ................. 701/89 |
| 6,729,426 B2 | * | 5/2004 | Suzuki ........................ 180/197 |
| 7,124,850 B2 | * | 10/2006 | Lee et al. ..................... 180/248 |
| 2003/0150660 A1 | | 8/2003 | Ohtsu |

FOREIGN PATENT DOCUMENTS

EP 1 142 745 A1 10/2001
EP 1 375 231 A2 1/2004

* cited by examiner

*Primary Examiner*—Tony H. Winner
(74) *Attorney, Agent, or Firm*—Westerman, Hattori, Daniels & Adrian, LLP.

(57) ABSTRACT

A driving force control apparatus for a four-wheel drive vehicle is provided for stably launching the vehicle irrespective of whichever condition of a road surface and whether or not a road is gradient. In the driving force control apparatus for a four-wheel drive vehicle configured to transmit a driving force of a prime mover directly to a left and a right main driving wheel and to a left and a right sub-driving wheel through a clutch, rotational speed sensors detect the rotational speed of the respective main driving wheels and sub-driving wheels, a 2/4 WD·ECU sets a fastening force of the clutch in accordance with a difference between the detected rotational speeds of the main driving wheels and the sub-driving wheels, determines that the four-wheel drive vehicle is in a slip stop state when at least one of the detected rotational speeds of the wheels is equal to or lower than a predetermined rotational speed, and corrects the clutch for the set fastening force when it determines that the four-wheel drive vehicle is in the slip stop state.

2 Claims, 12 Drawing Sheets

F I G. 4
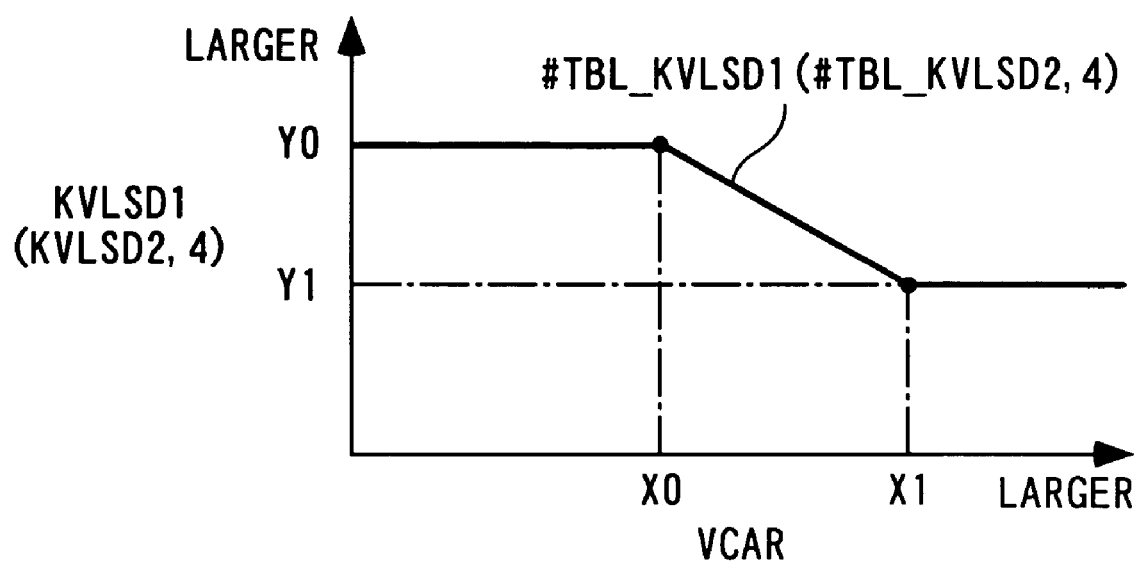

F I G. 1 4
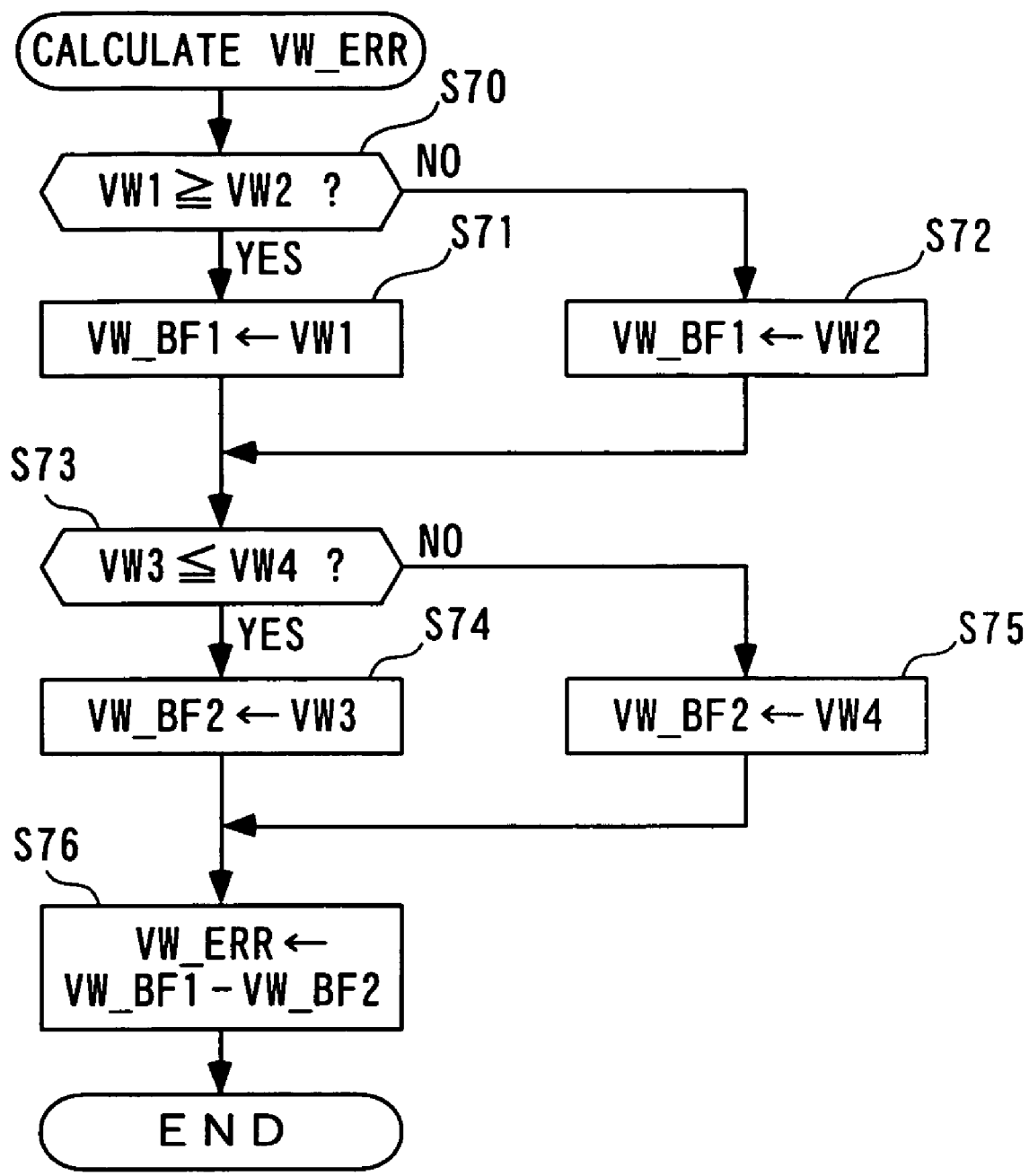

DRIVING FORCE CONTROL APPARATUS FOR FOUR-WHEEL DRIVE VEHICLE

BACKGROUND OF THE INVENTION

1. Field of the Invention

The present invention relates to a driving force control apparatus for a four-wheel drive vehicle which controls the distribution of a driving force to main driving wheels and sub-driving wheels.

2. Description of the Prior Art

A conventional driving force control apparatus for a four-wheel drive vehicle of the type mentioned above is known, for example, from one disclosed in Japanese Patent Publication No. 8-19981. In this four-wheel drive vehicle (hereinafter simply called the "vehicle"), a torque of a power plant having an engine, a transmission and the like is transmitted to front wheels and rear wheels from an output shaft of the power plant through a front wheel and a rear wheel propeller shaft, respectively. Also, a hydraulic clutch is disposed between the output shaft and the rear wheel propeller shaft, such that the driving force control apparatus controls a fastening force of this clutch to control the a torque transmitted to the rear wheels, i.e., the distribution of torques transmitted to the front wheels and rear wheels.

In the foregoing driving force control apparatus, a speed difference sensor detects a difference in rotational speed between the front and rear propeller shafts, and a target value for a torque to be transmitted to the rear wheels is set in accordance with the detected difference in rotational speed. The control apparatus comprises a control unit which stores three types of control characteristics (dry, wet, snow), different from one another, for setting the target value, such that one of the control characteristics is selected in response to a driver's operation on a selector switch. The control apparatus sets a target value for a torque to the rear wheels in accordance with the difference in rotational speed based on the selected control characteristics, and controls a fastening force of the clutch to control a torque transmitted to the rear wheel to the set target value. In this event, when the difference in rotational speed is below a first predetermined value or above a second predetermined value larger than the first predetermined value for a predetermined time period or longer due to variations in surface resistance, the selected control characteristic is changed to another control characteristic to set a different target value for the torque transmitted to the rear wheels. In this way, the torque transmitted to the rear wheels can be increased or decreased to transmit a proper torque to the rear wheels in accordance with the varying surface resistance, thereby properly distributing the torque to the front wheels and rear wheels.

However, the driving force control apparatus disclosed in Japanese Patent Publication No. 8-19981 described above can experience difficulties in stably launching a vehicle for the reasons set forth below on a road which is not uniform in surface condition and has variations in surface resistance for each wheel (hereinafter called the "split road").

When the control characteristic is set to be suitable for a level road, a vehicle can be smoothly launched on a level road, for example, even if the surface resistance is smaller on the front wheel side so that the front wheels are slipping, by increasing a torque distributed to the rear wheels from the difference in rotational speed between the front and rear wheels. However, if the front wheels are slipping when the vehicle is launched on a gradient road, the control characteristic suitable for a level load can distribute an insufficient torque to the rear wheels to possibly fail a stable launch.

Conversely, when the control characteristic is set to be suitable for a gradient road, though the vehicle can be smoothly launched on a gradient road, the vehicle cannot be stably launched on a level road due to an excessive torque distributed to the rear wheels, when the front wheels are slipping, to cause the vehicle to slide sideways. Also, in the event of a launch associated with slipping as mentioned above, even if the selected control characteristic is changed to another control characteristic to distribute a different torque to the rear wheels in response, the vehicle cannot still be stably launched due to a difference in torque which occurs upon switching the control characteristic.

SUMMARY OF THE INVENTION

The present invention has been made to solve the problems as mentioned above, and it is an object of the invention to provide a driving force control apparatus for a four-wheel drive vehicle which is capable of stably launching a vehicle irrespective of road surface conditions or whether a road is gradient or not.

To achieve the above object, the present invention provides a driving force control apparatus for a four-wheel drive vehicle configured to transmit a driving force of a prime mover directly to a left and a right main driving wheel and to a left and a right sub-driving wheel through a clutch. The driving force control apparatus is characterized by comprising rotational speed detecting means for detecting a rotational speed of each of the main driving wheels and the sub-driving wheels, fastening force setting means for setting a fastening force of the clutch in accordance with a difference between the detected rotational speeds of the main driving wheels and the sub-driving wheels, slip stop state determining means for determining that the four-wheel drive vehicle is in a slip stop state when at least one of the detected rotational speeds of the wheels is equal to or lower than a predetermined rotational speed, and fastening force correcting means for correcting the fastening force of the clutch set by the fastening force setting means when the slip stop state determining means determines that the four-wheel drive vehicle is in the slip stop state.

According to this driving force control apparatus, the driving force of the prime move is transmitted directly to the left and right main driving wheels and to the left and right sub-driving wheels through the clutch. The rotational speed detecting means detects the rotational speed of each of the main driving wheels and sub-driving wheels, such that the fastening force setting means sets the fastening force of the clutch in accordance with the difference between the detected rotational speeds of the main driving wheels and the sub-driving wheels. In this way, the distribution of the driving force transmitted to the main driving wheels and the sub-driving wheels is determined. Also, when at least one of the detected rotational speeds of the wheels is equal to or lower than the predetermined rotational speed, the slip stop state determining means determines that the vehicle is in the slip stop state, i.e., in a state in which the vehicle cannot be smoothly launched due to at least one of the wheels which is slipping and to an insufficient driving force to the remaining wheels, and the fastening force correcting means corrects the fastening force of the clutch.

As described above, when the vehicle is in the slip stop state, the fastening force of the clutch is corrected to correct the distribution of the torque between the front and rear main/sub-driving wheels, thus making it possible to increase a driving force transmitted, for example, to the wheels other than a slipping wheel. In this way, the vehicle can be launched without fail even on any of a road with a uniform surface resistance and a split road.

Preferably, in the driving force control apparatus for a four-wheel drive vehicle described above, the slip stop state determining means determines that the four-wheel drive vehicle is in the slip stop state when at least one wheel is rotating at a rotational speed equal to or lower than the predetermined rotational speed for a first predetermined time or longer.

According to this preferred embodiment of the driving force control apparatus for a four-wheel drive vehicle, the slip stop state determining means determines that the vehicle is in the slip stop state when the rotational speed of at least one wheel remains equal to or lower than the predetermined rotational speed for the first predetermined time, instead of immediately determining the slip stop state when the rotational speed falls to the predetermined rotational speed or lower.

In this way, a timing at which the clutch is corrected for the fastening force is delayed by the first predetermined time from the time at which the rotational speed of any of the wheels falls to the predetermined rotational speed or lower. In other words, the determined slip stop state is definitely determined after the predetermined time, so that the distribution of the torque between the main and sub-driving wheels is corrected when the vehicle is definitely in the slip stop state, thus making it possible to stably launch the vehicle while preventing the hunting of the control.

Preferably, the driving force control apparatus for a four-wheel drive vehicle described above further comprises counting means for counting the number of times the slip stop state determining means determines that the four-wheel drive vehicle is in the slip stop state, wherein the fastening force correcting means corrects the clutch for the fastening force in accordance with the counted count value.

According to this preferred embodiment of the driving force control apparatus for a four-wheel drive vehicle, the counting means counts the number of times the vehicle is determined to be in the slip stop state, such that the fastening force correcting means corrects the clutch for the fastening force in accordance with the counted number. Therefore, for example, the clutch can be corrected for the fastening force such that it increases in accordance with an increase in the counted number. In this way, by gradually increasing the torque distributed between the main driving wheels and the sub-driving wheels in accordance with the counted number, the vehicle can be smoothly launched, while preventing a sudden change in the distribution of the torque even when a larger driving force is required for launching, for example, on a gradient road.

Preferably, in the driving force control apparatus for a four-wheel drive vehicle described above, the slip stop state determining means determines that the four-wheel drive vehicle has exited the slip stop state when all of the main driving wheels and the sub-driving wheels are rotating at rotational speeds exceeding the predetermined rotational speed for a second predetermined time or longer after the four-wheel drive vehicle is determined to be in the slip stop state.

According to this preferred embodiment of the driving force control apparatus for a four-wheel drive vehicle, when the vehicle is determined to be in the slip stop state, this determination is maintained until the second predetermined time has elapsed from the time all the wheels rotate at their respective rotational speeds exceeding the predetermined rotational speed. In other words, when the rotational speeds exceed the predetermined rotational speed, the determined slip stop state is not immediately withdrawn but is withdrawn after the lapse of the second predetermined time.

In this way, the control can be prevented from hunting by definitely determining that the vehicle has exited the slip stop state only after it is ensured that the vehicle has exited the slip stop state. Also, since the fastening force correcting means continues to correct the clutch for the fastening force for the second predetermined time until it is definitely determined that the vehicle has exited the slip stop state, the vehicle can be smoothly run immediately after it gets out of the slip stop state, i.e., immediately after it is launched.

BRIEF DESCRIPTION OF THE DRAWINGS

FIG. 4 is an exemplary graphic representation of a VCAR-KVLSD1 table;

FIG. 14 is a flow chart illustrating a subroutine for calculating VW_ERR;

DETAILED DESCRIPTION OF THE EMBODIMENT

Figure 1:
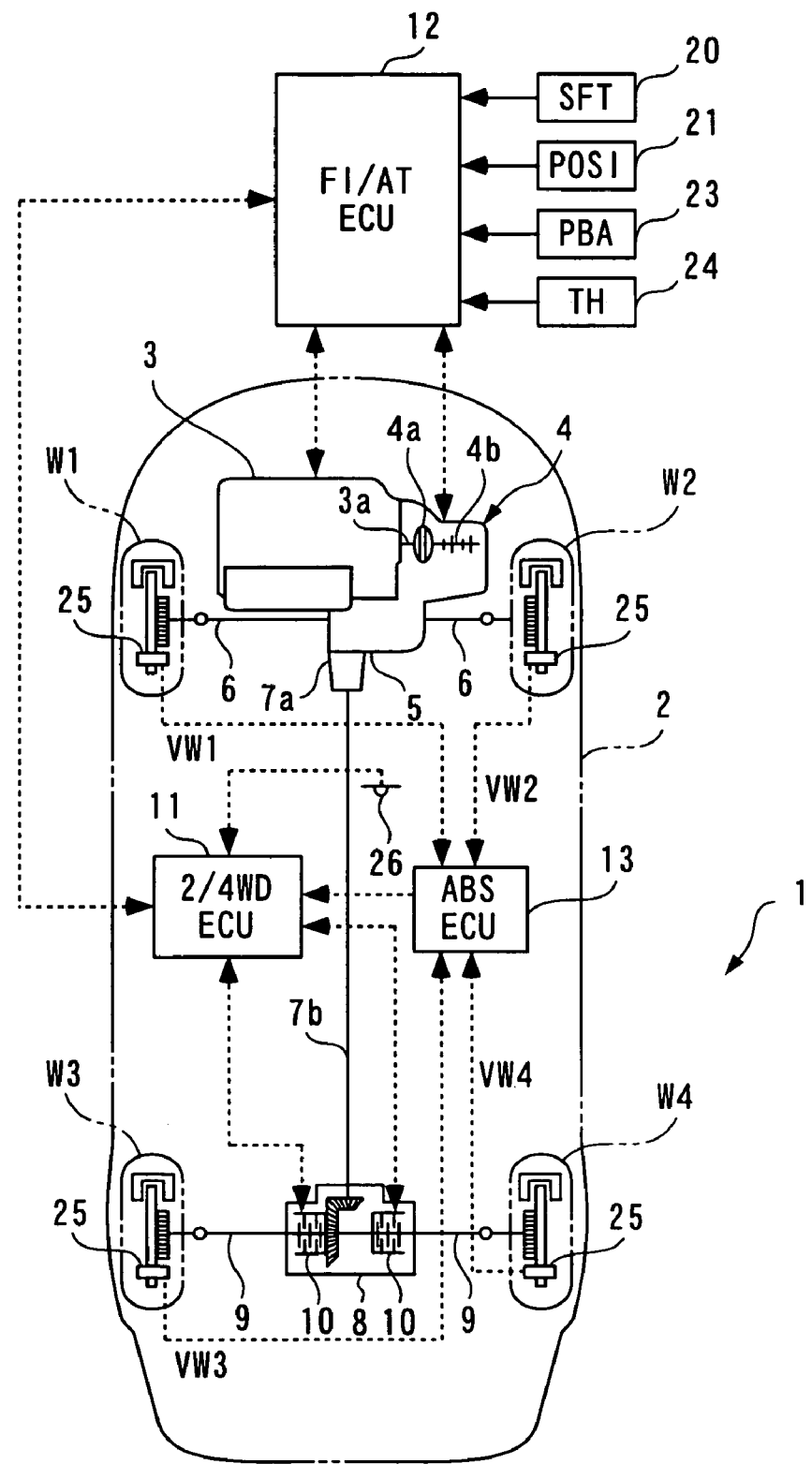
FIG. 1 is a diagram generally illustrating the configuration of a driving force control apparatus according to one embodiment of the present invention, and a four-wheel drive vehicle to which the control apparatus is applied.

In the following, an embodiment of the present invention will be described in detail with reference to the accompanying drawings. FIG. 1 generally illustrates the configuration of a driving force control apparatus 1 according to one embodiment, and a four-wheel drive vehicle 2 to which the driving force control apparatus 1 is applied. As illustrated, the four-wheel drive vehicle (hereinafter simply called the "vehicle") 2 comprises an engine 3 mounted sideways in a front region thereof (prime mover), and an automatic transmission 4 arranged integrally with the engine 3.

The automatic transmission 4 comprises a torque converter 4a coupled to an output shaft 3a of the engine 3; a shift lever (not shown) for selecting one shift position from eight shift positions consisting of 1, 2, 3, D4, D5, N, P, R; and a gear mechanism 4b (only part of which is shown) which can be switched among gear positions corresponding to six transmission ratios consisting of a first to a fifth speed gear positions and a reverse gear position. This automatic transmission 4 is switched to the first-speed gear position, a first to second speed gear position, a first to third speed gear position, a first to fourth speed gear position, a first to fifth speed gear position, and the reverse gear position, respectively, when the shift lever is placed at "1"-"D5" and "R," respectively. At these gear positions, the gear ratio is set smaller at a higher speed gear position.

A gear position sensor 20 and a shift position sensor 21 are attached to the automatic transmission 4. The gear position sensor 20 detects a gear position, and sends a gear position signal SFT, which is a detection signal generated thereby, to an FI/AT•ECU 12, later described. Specifically, the gar position signal SFT has the value (hereinafter called the "SFT value") of one to five when the gear position is at the first to fifth gear positions, and the value of six when the shift lever is at the reverse gear position.

The shift position sensor 21, in turn, detects a selected shift position, and sends a shift position signal POSI, which is a detection signal generated thereby, to the FI/AT•ECU 12. Specifically, the shift position signal POSI has the value of one, two, and three to seven when the shift position is at "N" or "P," "R," and "1" to "D5," respectively, and has the value of zero when the shift lever lies between two shift positions so that no shift position can be identified (non-position state).

The FI/AT•ECU 12, which controls the operation of the engine 3 and automatic transmission 4, is based on a microcomputer which comprises a ROM, a RAM, a CPU, an I/O interface, and the like (none of which is shown). An absolute intake pipe inside pressure sensor 23 and a throttle valve opening sensor 24 are connected to the FI/AT•ECU 12. The absolute intake pipe inside pressure sensor 23 and the throttle valve opening sensor 24 detect an absolute intake pipe inside pressure PBA and a throttle valve opening TH of the engine 3, respectively.

The engine 3 has its output shaft 3a coupled to a left and a right front wheel W1, W2, which serve as main driving wheels, through the transmission 4, a front differential 5, and front drive shafts 6. The output shaft 3a is also coupled to a left and a right rear wheel W3, W4, which serve as sub-driving wheels, through the automatic transmission 4, the front differential 5, a transfer 7a, a propeller shaft 7b, a rear differential 8, and a left and a right rear drive shaft 9.

The rear differential 8 comprises a left and a right electromagnetic clutch 10. Each of the electromagnetic clutches 10 connects and breaks between the propeller shaft 7a and the rear drive shaft 9. When the electromagnetic clutches 10 are in a breaking state, a driving force (hereinafter called the "torque") of the engine 3 is entirely transmitted to the front wheels W1, W2 to place the vehicle in a front-wheel drive mode. On the other hand, when the electromagnetic clutches 10 are in a connecting state, the torque of the engine 3 is distributed to the rear wheels W3, W4 to place the vehicle in a four-wheel drive mode. Further, a fastening force of the respective electromagnetic clutches 10, when in the connecting state, continuously varies in response to a driving signal from a 2/4 WD•ECU 11, thereby controlling torques distributed to the left and right rear wheels W3, W4 independently of each other.

A rotational speed sensor 25 (rotational speed detecting means), comprised of a rotor and an electromagnetic pickup, is attached to each of the front and rear wheels W1-W4. These four rotational speed sensors 25 detect rotational speeds VW1-VW4 of the front and rear wheels W1-W4, respectively, and send their detection signals to an ABS•ECU 13.

The ABS•ECU 13, which conducts an anti-lock control for the front and rear wheels W1-W4, is based on a microcomputer, like the aforementioned FI/AT•ECU 12.

A lock switch 26 is mounted on a dash board, not shown. The lock switch 26, which forces the 2/4 WD•ECU 11 to conduct a lock mode control for locking the rear differential 8, sends a lock switch signal to the 2/4 WD•ECU 11, when it is pushed down by the driver, for indicating the pushed lock switch 26.

The 2/4 WD•ECU 11 is based on a microcomputer, like the FI/AT•ECU 12 and the ABS•ECU 13, and is connected to these ECU's 12, 13 to apply the detection signals of the sensors 20, 21, 23, 24 to the 2/4 EW•ECU 11 through serial communications therewith. The 2/4 EW•ECU 11, in response to these input signals and the aforementioned lock switch signal, calculates a torque distributed to the rear wheels W3, W4 (LSD torque TLSD) and the amount of current supplied to a coil of each electromagnetic clutch 10 corresponding to the torque in the following manner. Then, the 2/4 EW•ECU 11 outputs a driving signal based on the result of the calculation to the electromagnetic clutches 10 to control their fastening forces, thus controlling the torque distributed to the rear wheels W3, W4.

Figure 2:
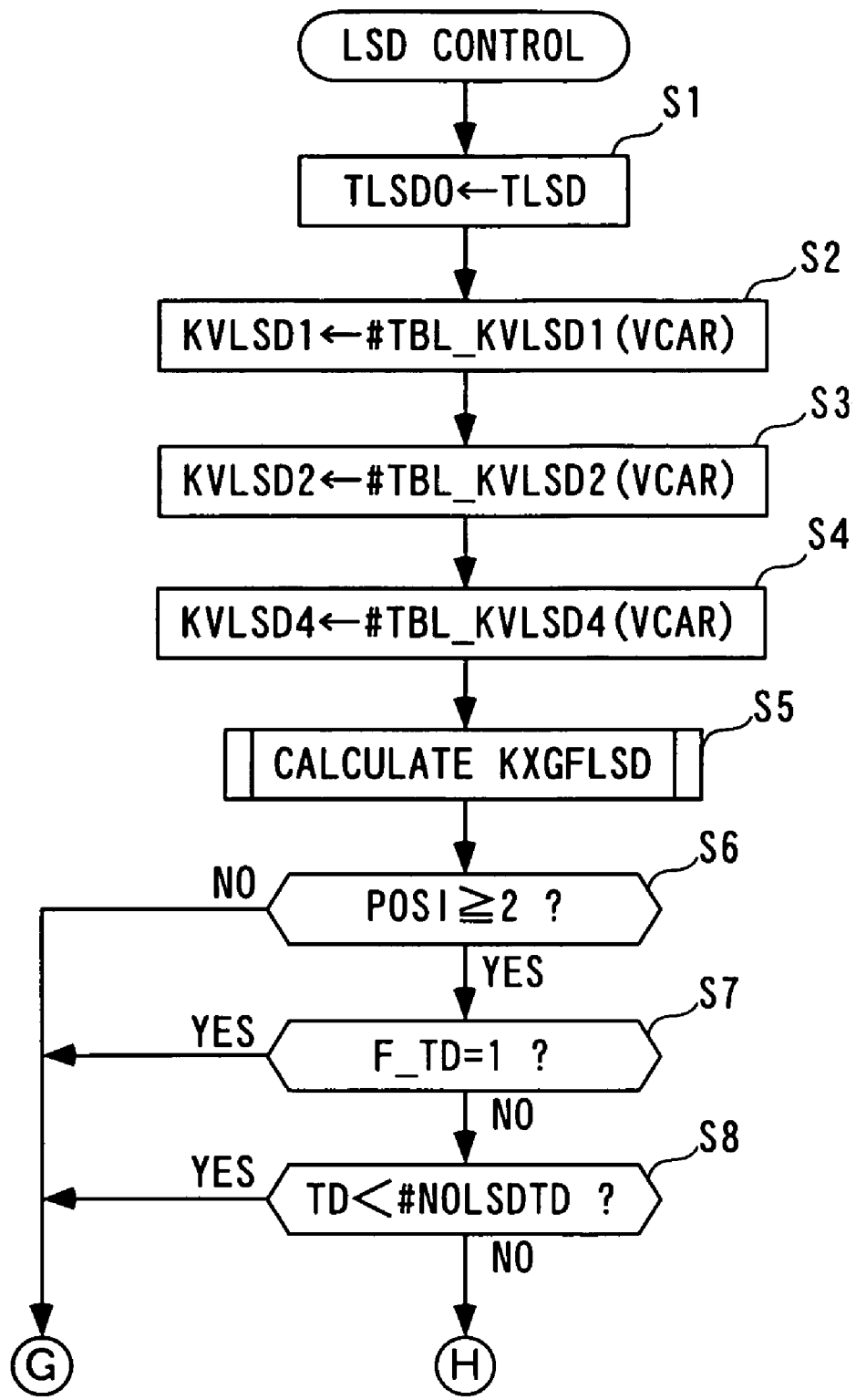
FIGS. 2 and 3 are flow charts illustrating in combination a main routine of an LSD control process.
Figure 3:
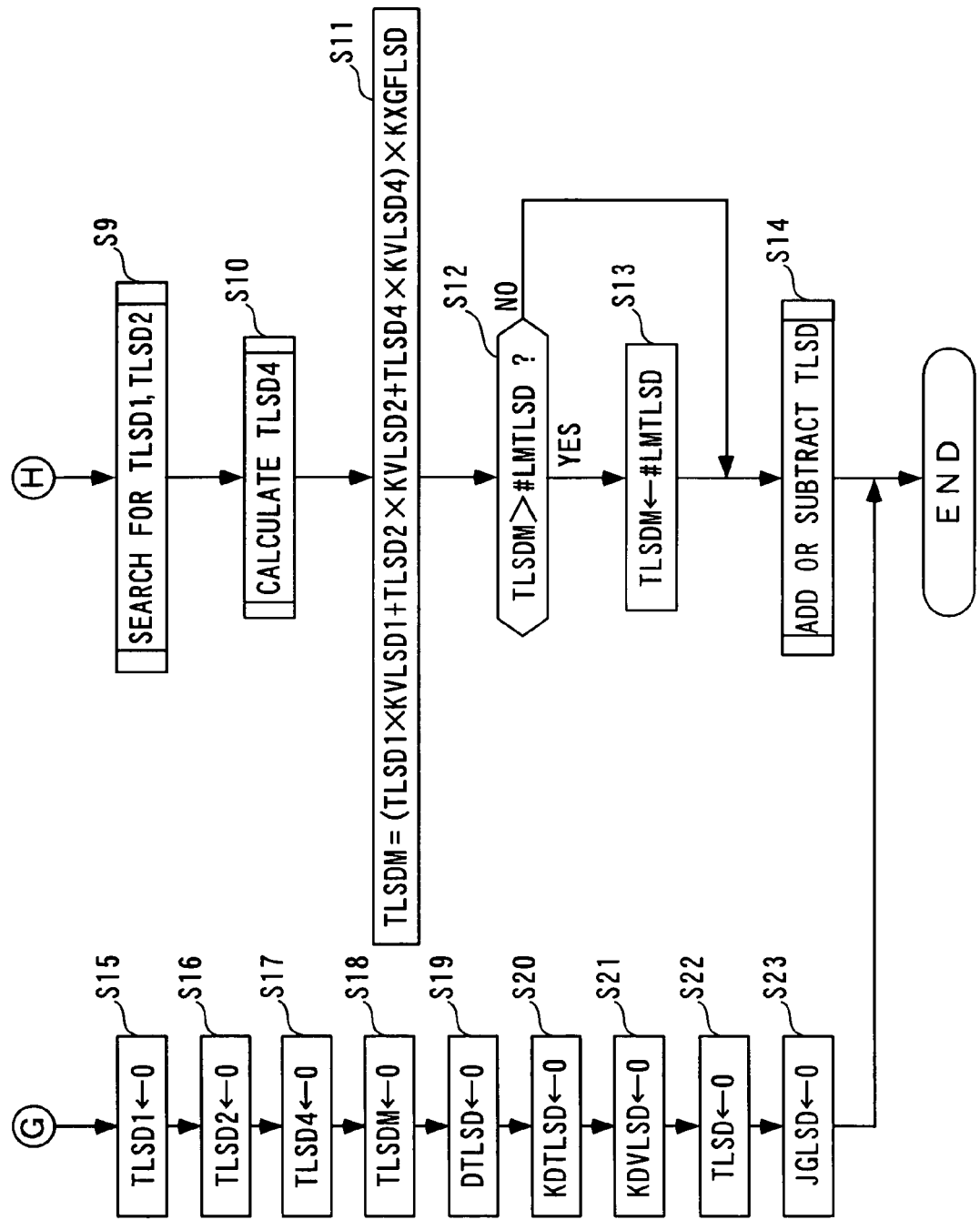

In the following, a description will be given of an LSD control process executed by the 2/4 EW•ECU 11. This process is executed to calculate the LSD torque TLSD based on the front and rear wheel speeds VW1-VW4, a drive torque TD, later described, and the like. FIGS. 2 and 3 illustrate a main routine of the LSD control process. As illustrated, first in this process, the 2/4 EW•ECU 11 updates the LSD torque TLSD calculated in the preceding execution as its preceding value TLSD0.

Next, the process goes to step 2, where the 2/4 EW•ECU 11 searches a VCAR-KVLSD1 table, one example of which is shown in FIG. 4, for a table value #TBL_KVLSD1, and sets this table value as a TLSD1 correction coefficient KVLSD1. The vehicle speed VCAR can be found by correcting the smaller one of the left and right rear wheel speeds VW3, VW4 in accordance with an accelerating state or a decelerating state.

As shown in FIG. 4, in this VCAR-KVLSD1 table, the table value #TBL_KVLSD1 is set to a predetermined value Y0 (for example, 1.0) when the vehicle speed VCAR is equal to or lower than a predetermined value X0; to a predetermined value Y1 equal to or smaller than the predetermined value Y0 when the vehicle speed VCAR is equal to or higher than a predetermined value X1; and to a linearly smaller value when the vehicle speed VCAR is between the predetermined value X0 and the predetermined value X1 as the vehicle speed VCAR is higher. This is because the front wheels W1, W2, which are the main driving wheels, are less susceptible to slips as the vehicle speed VCAR is higher, so that a smaller torque is required for driving the rear wheels W3, W4.

In FIG. 4, a curve in the graph shows the table value #TBL_KVLSD1, and the notation #TBL_KVLSD1(VCAR) at step 2 in FIG. 2 means that the table value #TBL_KVLSD1 is found in accordance with the vehicle speed VCAR. Such a notation in the flow chart is applied as well to all flow charts described below.

Next, the process goes to step 3, where the 2/4 EW•ECU 11 searches the VCAR-KVLSD2 table, additionally drawn in FIG. 4, in accordance with the vehicle speed VCAR for a table value #TBL_KVLSD2, and sets this table value as a TLSD2 correction coefficient KVLSD2.

In this VCAR-KVLSD2 table, the table value #TBL_KVLSD2 is set to a value in a similar tendency to but different from the table value #TBL_KVLSD1 depending on the vehicle speed VCAR. This is because the front wheels W1, W2, which are the main driving wheels, are less susceptible to slips as the vehicle speed VCAR is higher, as described above, so that a smaller torque is required for driving the rear wheels W3, W4.

Next, the process goes to step 4, where the 2/4 EW•ECU 11 searches a VCAR-KVLSD4 table, additionally drawn in FIG. 4, in accordance with the vehicle speed VCAR for a table value #TBL_KVLSD4, and sets this table value as a TLSD4 correction coefficient KVLSD4. In this VCAR-KVLSD4 table, the table value #TBL_KVLSD4 is set to a value in a similar tendency to but different from the table values TBL_KVLSD1 and #TBL_KVLSD2 for the same reason as that at the aforementioned steps 2 and 3.

Next, the process goes to step 5, where the 2/4 EW•ECU 11 execute a KXGFLSD calculation subroutine in a manner later described, to calculate an acceleration LSD correction coefficient KXGFLSD.

Next, the process goes to step 6, where the 2/4 EW•ECU 11 determines whether or not the POSI (shift position) value is equal to or larger than two. When the answer to step 6 is YES, i.e., when the shift position is at any of "1" to "D5" and "R," the process goes to step 7, where the 2/4 EW•ECU 11 determines whether or not a drive torque flag F_TD is "1."

The drive torque flag F_TD is set to "1" when a drive torque TD, later described, is equal to or less than zero, i.e., when the vehicle is stationary or decelerating, and to "0" when the drive torque TD is larger than "0," i.e., when the vehicle is accelerating.

When the result of the determination at step 7 is NO, i.e., when the vehicle is accelerating, the process goes to step 8, where the 2/4 EW•ECU 11 determines whether or not the drive torque TD is less than a predetermined value #NOLSDTD.

The drive torque TD is calculated based on an engine torque outputted from the engine 3 as a torque outputted to the output shaft of the automatic transmission 4. More specifically, the drive torque TD is calculated by correcting the engine torque with a torque conversion amplification factor, a gear ratio, an inertia correction torque, or the like.

When the result of the determination at step 8 is NO, i.e., TD≧#$NOLSDTD, the process goes to step 9 in FIG. 3, where the 2/4 EW•ECU 11 finds a first and a second LSD torque TLSD1, TLSD2 by a TLSD1 and TLSD2 search subroutine, later described.

Next, the process goes to step 10, where the 2/4 EW•ECU 11 finds a launch-time LSD torque TLSD4 through a TLSD4 calculation subroutine, later described.

Next, the process goes to step 11, where the 2/4 EW•ECU 11 calculates an LSD torque target value TLSDM by the following equation (1):

$$TLSDM = (TLSD1 \times KVLSD1 + TLSD2 \times KVLSD2 + TLSD4 \times KVLSD4) \times KXGFLSD \quad (1)$$

Next, at steps 12, 13, the 2/4 EW•ECU 11 executes a limit checking operation for the LSD torque target value calculated as mentioned above. Specifically, at step 12, the 2/4 EW•ECU 11 determines whether or not the LSD torque target value TLSDM is larger than an upper limit value #LMTLSD. When TLSDM>#LMTLSD, the process goes to step 13, where the 2/4 EW•ECU 11 sets the LSD torque target value to the upper limit value #LMTLSD. On the other hand, when TLSDM<#LMTLSD, step 13 is skipped.

Subsequent to the limit checking operation at steps 12, 13, the process goes to step 14, where the 2/4 EW•ECU 11 calculates an LSD torque TLSD through a TLSD addition/subtraction subroutine, later described, followed by termination of the LSD control process.

On the other hand, when the result of the determination at the aforementioned step 6 is NO, i.e., POSI=1 or 0 with the shift position being at "N" or "P" or in the non-position state, the 2/4 EW•ECU 11 sets the aforementioned first LSD torque TLSD1, second LSD torque TLSD2, launch-time LSD torque TLSD4, and LSD torque target value TLSMD to zero, respectively, at steps 15 to 18.

Next, at steps 19 to 23, the 2/4 EW•ECU 11 sets a deviation DTLSD, a first addition/subtraction adjusting coefficient KDTLSD, a second addition/subtraction adjusting coefficient KDVLSD, an LSD torque TLSD, and an anteroposterior slip ratio threshold JGLSD to zero, respectively, followed by termination of the LSD control process. The foregoing deviation, coefficients, and threshold will be later described in greater detail.

Figure 5:
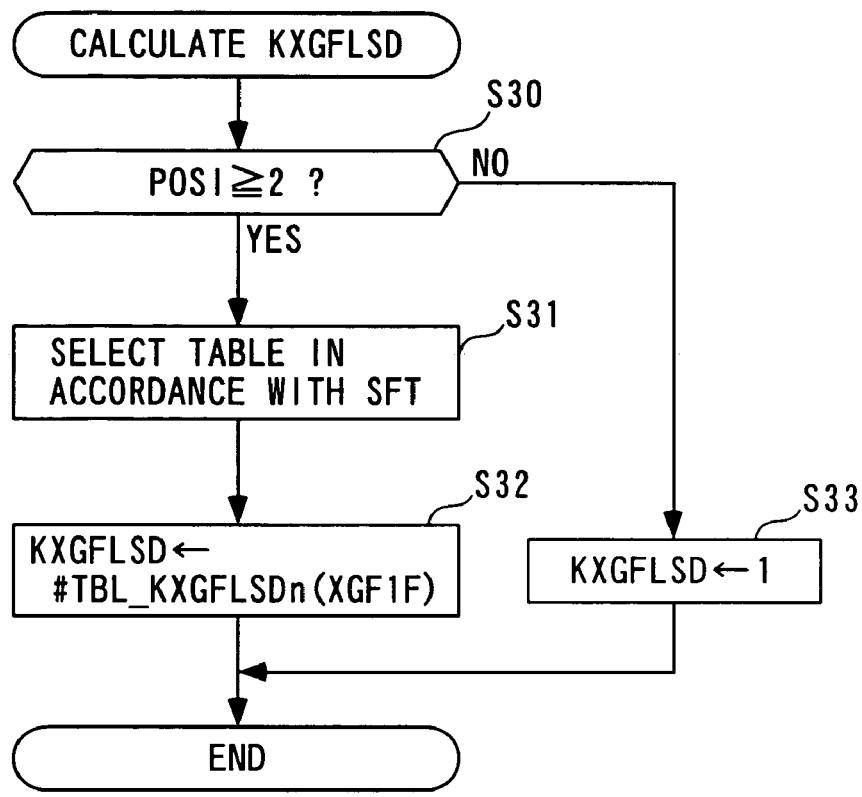
FIG. 5 is a flow chart illustrating a subroutine for calculating KXGFLSD.

Next, referring to FIG. 5, a description will be given of the aforementioned KXGFLSD calculation subroutine executed at step 4. This subroutine calculates the acceleration LSD correction coefficient KXGFLSD based on the POSI value, the SFT value, and a filtered vehicle acceleration XGF1F, as will be later described. First, at step 30, the 2/4 EW•ECU 11 determines whether or not the POSI value is equal to or larger than two.

Figure 6:
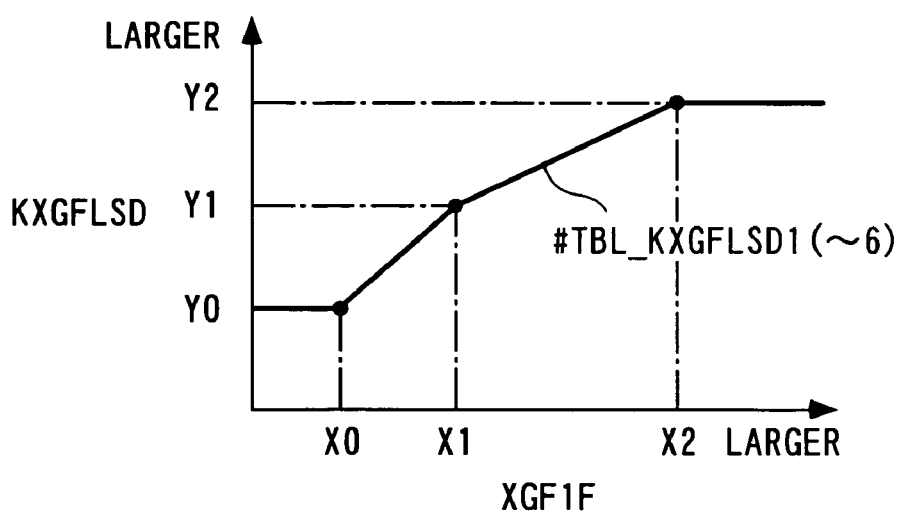
FIG. 6 is an exemplary graphic representation of a KGF1F-KXGFLSD1 table.

When the result of the determination at step 30 is YES, i.e., when the shift position is at any of "1" to "D5" and "R," the subroutine goes to step 31, where the 2/4 EW•ECU 11 selects one from XGF1F-KXGFLSDn tables (n=1-6), examples of which are shown in FIG. 6, in accordance with the SFT value. Then, the subroutine goes to step 32, where the 2/4 EW•ECU 11 searches the selected XGF1F-KXGFLSDn table for a table value KXGFLSDn, and sets this table value as an acceleration LSD correction coefficient KXGFLSD, followed by termination of the KXGFLSD calculation subroutine.

The filtered vehicle acceleration XGF1F is derived by calculating the vehicle acceleration XGF based on the drive torque TD, the weight of the vehicle 2, the diameter of the wheels, and a running resistance of the vehicle 2, and applying a predetermined filtering operation to the vehicle acceleration XGF. In other words, since the filtered vehicle acceleration XGF1F is calculated as a residual vehicle acceleration used only for actually accelerating the vehicle 2, the filtered vehicle acceleration XGF1F well reflect an actual accelerating state of the vehicle 2. Also, the XGF1F-KXGFLSDn tables, from which one is selected at step 31, have been provided for the first to fifth speed and R-gear positions corresponding to the SFT value from one to six. FIG. 6 shows the XGF1F-KXGFLSD1 table for the first speed gear position. As shown in FIG. 6, the table value #TBL_KXGFLSD1 is set to a predetermined value Y0 when the filtered vehicle acceleration XGF1F is equal to or smaller than a predetermined value X0; to a predetermined value Y2 (for example, 1.0) larger than the predetermined value Y0 when the filtered vehicle acceleration XGF1F is equal to or smaller than the predetermined value X0; and to a smaller value as the filtered vehicle acceleration XGF1F is smaller between the predetermined value X0 and the predetermined value X2.

This setting is made with the intention of correcting the LSD torque TLSD to be smaller when no acceleration is required, such as when the accelerator is released. Also, as will be later described, the LSD torque TLSD is calculated based on parameters indicative of the speeds and accelerations of the wheels W1-W4 except for the acceleration TLSD correction coefficient KXGFLSD. Therefore, if the LSD torque TLSD is calculated without using the acceleration LSD correction coefficient KXGFLSD, the resulting LSD torque TLSD sometimes does not match a torque required by the vehicle 2 from its accelerating state because the parameter indicative of the drive torque TD for driving the wheels W1-W4 is not taken into account. Thus, the table value #TBL_KXGFLSD1 is set as mentioned above in order to distribute the LSD torque which matches a torque required from an accelerating state of the vehicle 2 to the rear wheels W3, W4. In this way, the 2/4 EW•ECU 11 determines from a difference in speed between the front and rear wheels that the front wheels W1, W2 are slipping when the filtered vehicle acceleration XGF1F is small, for example, due to the fact that a surface resistance µ is small and the accelerator pedal is not trodden, and can prevent the LSD torque TLSD larger than the torque required from the accelerating state of the vehicle 2 from being distributed to the rear wheels W3, W4, thus making it possible to prevent the rear wheels W3, W4 from slipping due to such a large torque. In other words, the LSD torque TLSD can be appropriately corrected in a well balanced manner in accordance with the surface resistance µ.

Further, in these XGF1F-KXGFLSDn tables, the table value #TBL_KXGFLSDn are set to different values from one another such that they show a similar tendency to the filtered vehicle acceleration XGF1F, and that a table associated with a higher gear position presents a smaller value for the same filtered vehicle acceleration XGF1F. Specifically, the table value #TBL_KXGFLSD1 for the first-speed gear position is set largest. This is because a lower speed gear position requires a larger torque for driving the rear wheels W3, W4 due to an increase in both the inertial mass of the output gear and a request for acceleration by the driver.

On the other hand, when the result of the determination at step 30 is NO, i.e., when the shift position is at "N" or "P," or in the non-position state, the subroutine proceeds to step 33 where the 2/4 EW•ECU 11 sets the acceleration LSD correction coefficient KXGFLSD to one, followed by termination of the KXGFLSD calculation subroutine.

Figure 7:
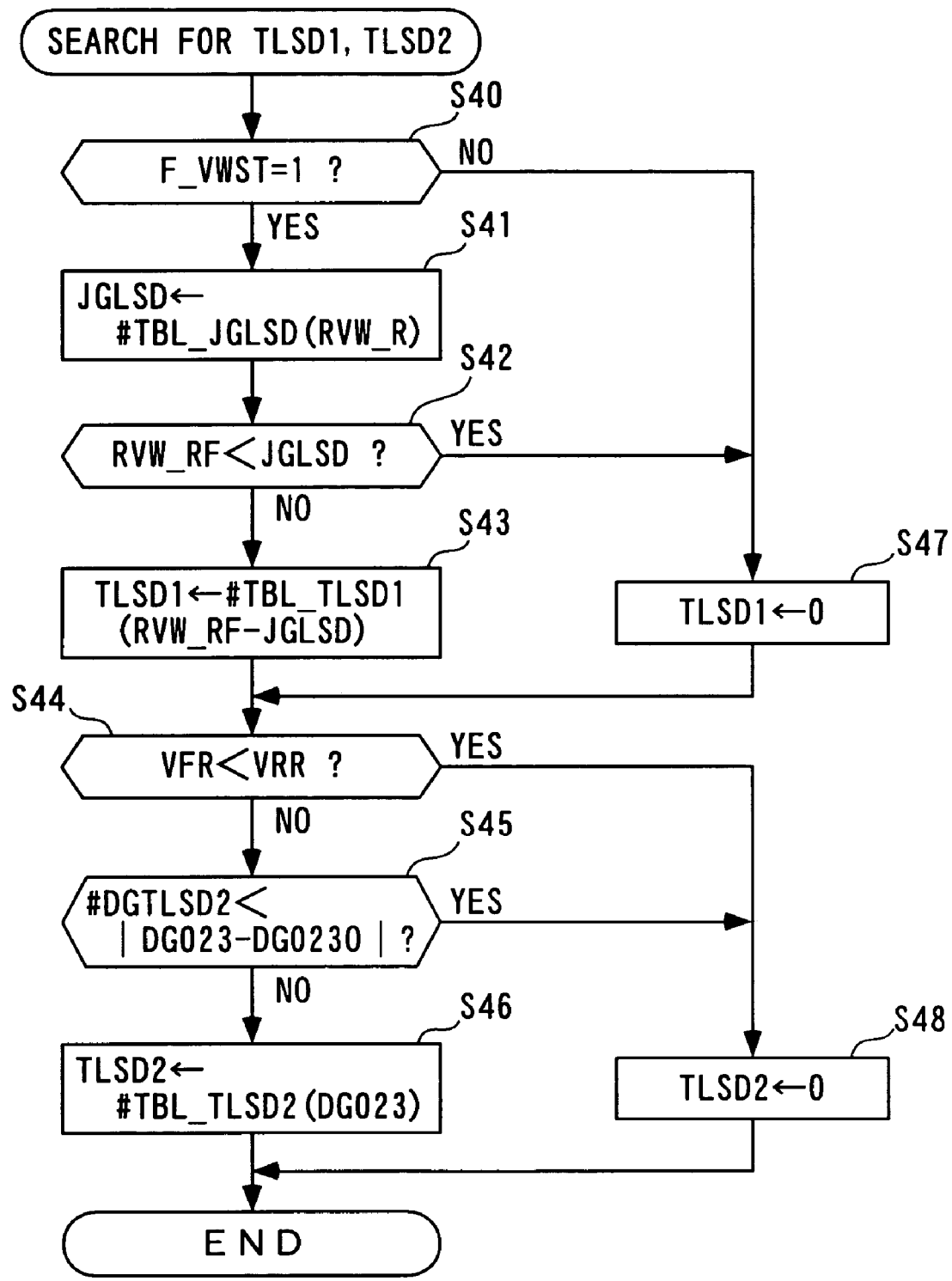
FIG. 7 is a flow chart illustrating a subroutine for searching for TLSD1 and TLSD2.

Referring next to FIG. 7, a description will be given of a TLDS1/TLDS2 search subroutine executed at step 9 mentioned above. As illustrated in FIG. 7, in this subroutine, the 2/4 EW•ECU 11 first determines at step 40 whether or not a running flag F_VWST is "1." This running flag F_VWST is set to "1" when the vehicle 2 is running with the front and rear wheel speeds VW1-VW4 being equal to or higher than a predetermined speed (for example, 5 km/h), and otherwise to "0," respectively.

Figure 8:
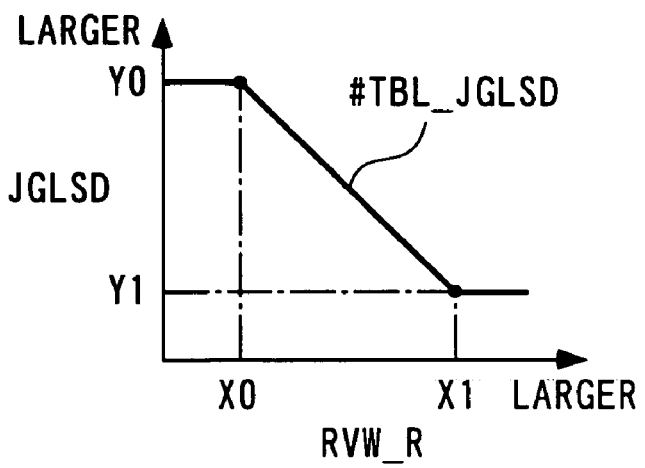
FIG. 8 is an exemplary graphic representation of a RVW_R-JGLSD table.

When the result of the determination at step 40 is YES, i.e., when the vehicle 2 is running, the subroutine goes to step 41, where the 2/4 EW•ECU 11 searches an RVW_R-JGLSD table, one example of which is shown in FIG. 8, for a table value #TBL_JGLSD in accordance with a rear wheel left to right speed ratio RVW_R, and sets this table value as a front/rear wheel slip ratio threshold JGLSD. The rear wheel left to right speed ratio RVW_R is calculated by dividing the smaller one of the left rear wheel speed VW3 and the right rear wheel speed VW4 by the larger one, and converting the resulting quotient into percentage. Specifically, when VW3<VW4, RVR_R=(VW3/VW4)×100 (%); when VW3>VW4, RVW_R=(VW4/VW3)×100 (%); and when VW3=VW4, RVW_R=100 (%).

As shown in FIG. 8, in the RVW_R-JGLSD table, the table value #TBL_JGLSD is set to a predetermined value Y0 when the rear wheel left to right speed ratio RVW_R is equal to or lower than a predetermined value X0; to a predetermined value Y1 smaller than the predetermined value Y0 when the rear wheel left to right speed ratio RVW_R is equal to or larger than a predetermined value X1; and to a linearly larger value as the rear wheel left to right speed ratio RVW_R is smaller when the rear wheel left to right speed ratio RVW_R is between the predetermined value X0 and the predetermined value X1. This setting is made because as the rear wheel left to right speed ratio RVW_R is higher, i.e., as there is a larger difference in speed between the left and right rear wheels W3, W4, a first LWD torque distributed to the rear wheels W3, W4, as calculated at step 43 later described is set to a smaller value.

Next, the subroutine goes to step 42, where the 2/4 EW•ECU 11 determines whether or not the front/rear wheel slip ratio threshold retrieved at step 41 is larger than the front/rear wheel slip ratio RVW_RF. This front/rear wheel slip ratio RVW_R is calculated by dividing an average rear wheel speed VRR by an average front wheel speed VRF, and converting the resulting quotient into percentage (RVW_RF=(VRR/VRF)×100 (%)). The average front wheel speed VRF in turn is calculated by averaging left and right filtered front wheel speeds FVW1, FVW2 which are produced by applying predetermined filtering to the left and right front wheel speeds VW1, VW2. Similar to this, the average rear wheel speed is also calculated by averaging left and right filtered rear wheel speeds FVW3, FVW4 which are produced by applying predetermined filtering to the left and right rear wheel speeds VW3, VW4.

In this embodiment, the front/rear wheel slip ratio threshold JGLSD is found at step 42 in accordance with the rear wheel left to right speed ratio RVW_R. Alternatively, a front/rear wheel slip ratio threshold JGLSD may be found in accordance with a difference between the left rear wheel speed VW3 and the right rear wheel speed VW4.

Figure 9:
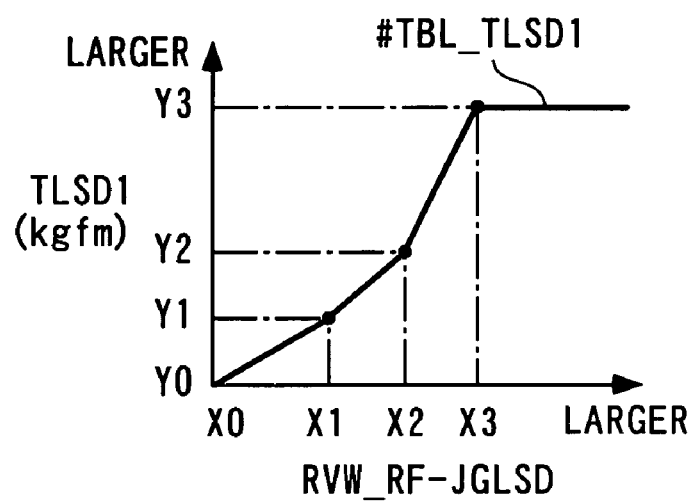
FIG. 9 is an exemplary graphic representation of an [RVW_RF-JGLSD]-TLSD1 table.

When the result of the determination at step 42 is NO, i.e., RVW_R≧JGLSD, the subroutine goes to step 43, where the 2/4 EW•ECU 11 searches an [RVW_FR-JGLSD]-TLSD1 table, one example of which is shown in FIG. 9, for a table value #TBL_TLSD1 in accordance with the difference [RVW_RF-JGLSD] between the front/rear wheel slip ratio RVW_RF and the front/rear wheel slip ratio threshold JGLSD, and sets the table value as a first LSD torque TLSD1.

As shown in FIG. 9, in the [RVW_RF-JGLSD]-TLSD1 table, the table value #TBL_TLSD1 is set to a predetermined value Y3 when the difference [RVW_RF-JGLSD] is equal to or larger than a predetermined value X3; and to a smaller value as the difference [RVW_RF-JGLSD] is smaller when the difference [RVW_RF-JGLSD] is between a predetermined value X0 and the predetermined value X3. This setting is made with the intention of preventing a tight turn braking phenomenon by reducing the value of the first LSD torque TLSD1 distributed to the left and right rear wheels W3, W4 as the difference [RVW_RF-JGLSD] is smaller.

In this embodiment, the first LSD torque TLSD1 is found in accordance with the difference [RVW_RF-JGLSD] at step 43, but alternatively, the first LSD torque TLSD1 may be found in accordance with the ratio of the front/rear wheel slip ratio RVW_RF to the front/rear wheel slop ratio threshold JGLSD (RVW_RF/JGLSD).

Next, the subroutine goes to step 44, where the 2/4 EW•ECU 11 determines whether or not the average front/rear wheel speed VRF is lower than the average rear wheel speed VRR. When the result of the determination at step 44 is NO, i.e., VFR≧VRR, the subroutine goes to step 45, where the 2/4 EW•ECU 11 determines whether or not an absolute difference |DG023-DG0230| between the difference DG023 (=G02-G03) between the average front wheel acceleration G02 and the average rear wheel acceleration G03 and the preceding value of the difference DG023 is larger than a predetermined threshold #DGTLSD2.

The average front wheel acceleration G02 is calculated by finding a right left wheel acceleration G0L from a difference between a current value VW1n and the preceding value VW1n-1 of the right left wheel speed VW1, finding a right front wheel acceleration G0R in a similar manner, and averaging these right left wheel acceleration G0L and right front wheel acceleration G0R. Similar to this, the average rear wheel acceleration G03 is also calculated.

Figure 10:
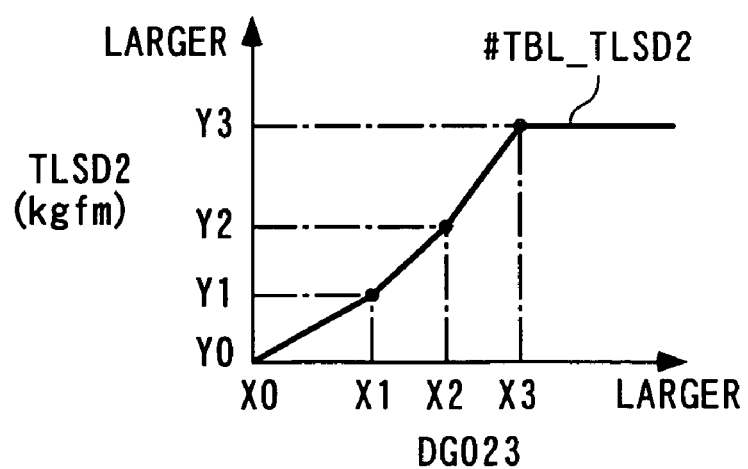
FIG. 10 is an exemplary graphic representation of a DG023-TLSD2 table.

When the result of the determination at step 45 is NO, i.e., |DG023-DG0230|≦#DGTLSD2, the subroutine goes to step 46, where the 2/4 EW•ECU 11 searches a DG023-TLSD2 table, one example of which is shown in FIG. 10, for a table value #TBL_TLSD2 in accordance with the difference DG023, and sets the table value as a second LSD torque TLSD2, followed by termination of the TLDS1/TLDS2 search subroutine.

As shown in FIG. 10, in the DG023-TLSD2 table, the table value #TBL_TLSD2 is set to a predetermined value Y3 when the difference DG023 is equal to or larger than a predetermined value X3; and to a larger value as the difference DG023 is larger when the difference DG023 is between a predetermined value X0 and the predetermined value X3. This setting is made with the intention of improving the responsibility of slip elimination/suppression of the front wheels W1, W2 by increasing the value of the second LSD torque TLSD2 distributed to the rear wheels W3, W4 as the average front wheel acceleration G02 exceeds the average rear wheel acceleration G03 at a larger degree.

In this embodiment, the second LSD torque TLSD2 is found in accordance with the difference DG023 at step 46, but alternatively, the second LSD torque TLSD2 may be found in accordance with the ratio of the average front wheel acceleration G02 to the average rear wheel acceleration G03 (G02/G03).

On the other hand, when the result of the determination at step 40 is NO, or when the result of the determination at step 42 is YES, the 2/4 EW•ECU 11 sets the first LSD torque TLSD1 to zero at step 47, followed by the subroutine proceeding to the aforementioned step 44 onward. In other words, when the vehicle 2 is at a stop or running straight, the first LSD torque TLSD1 is not distributed to the rear wheels W3, W4.

On the other hand, when the result of the determination at step 44 or 45 is YES, the subroutine goes to step 48, where the 2/4 EW•ECU 11 sets the second LSD torque TLSD2 to zero, followed by termination of the TLDS1/TLDS2 search subroutine. Specifically, when the front wheels W1, W2 are slipping with VFR<VRR, or when |DG023-DG023O|>#DGTLSD2 with the absolute difference |DG023-DG023O| large enough to cause a torque step, the second LSD torque TLSD2 is not distributed to the rear wheels W3, W4.

Figure 11:
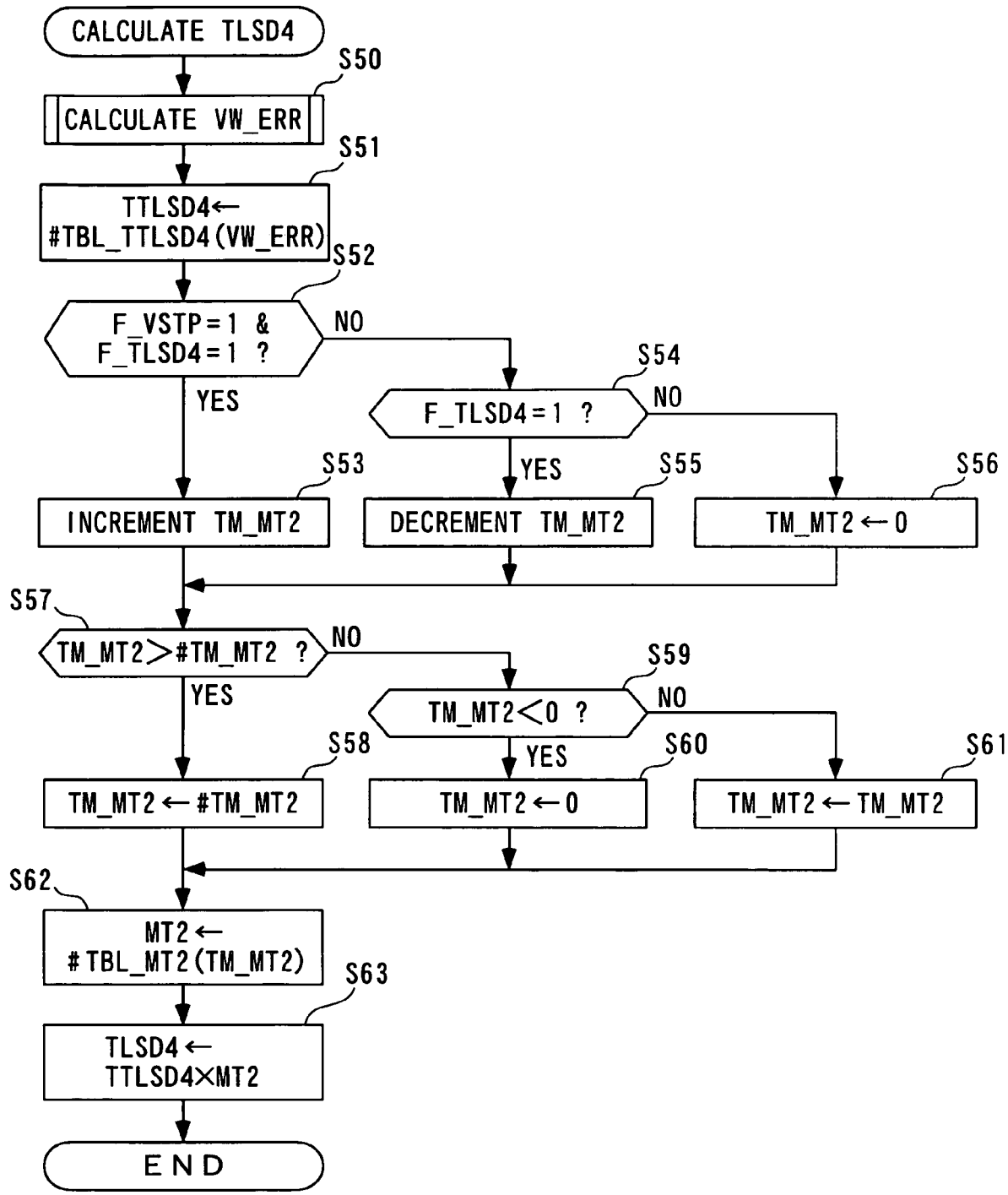
FIG. 11 is a flow chart illustrating a subroutine for calculating TLSD4.

Referring next to FIG. 11, a description will be given of the aforementioned TLSD4 calculation subroutine executed at step 10. This subroutine is executed at a predetermined period (for example, every one second). As illustrated in FIG. 11, in this subroutine, the 2/4 EW•ECU 11 first executes a VW_ERR calculation subroutine, later described, at step 50 to calculate a front/rear wheel maximum speed difference VW_ERR. As will be later described, this front/rear wheel maximum speed difference VW_ERR represents the degree of slip of the front wheels W1, W2 to the rear wheels W3, W4.

Figure 12:
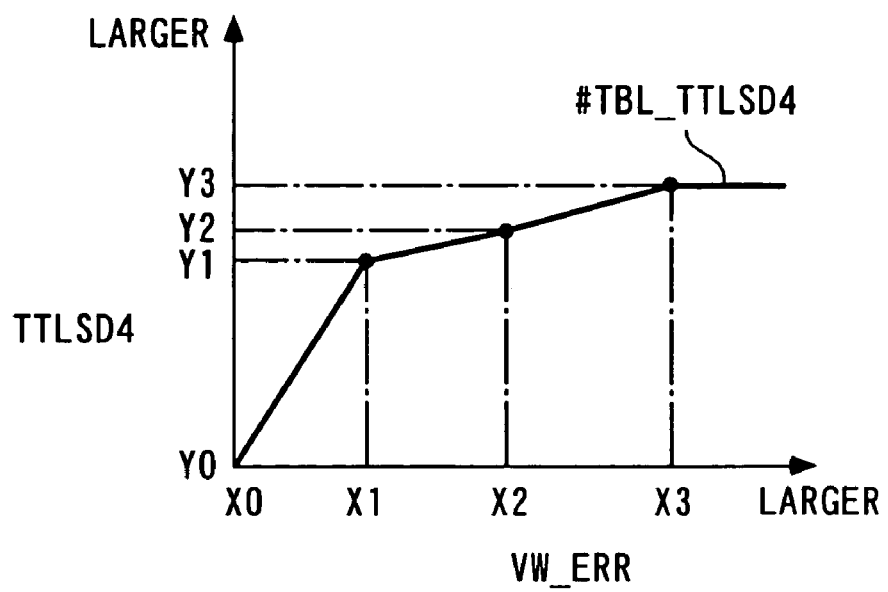
FIG. 12 is an exemplary graphic representation of a VW_ERR-TTLSD4 table.

Next, the subroutine goes to step 51, where the 2/4 EW•ECU 11 searches a VW_ERR-TTLSD4 table, one example of which is shown in FIG. 12, for a table value #TBL_TTLSD4 in accordance with the front/rear wheel maximum speed difference WV_ERR, and sets the table value as an uncorrected launch-time LSD torque TTLSD4.

As shown in FIG. 12, in the VW_ERR-TTLSD4 table, the table value #TBL_TTLSD4 is set to a predetermined value Y3 when the front/rear wheel maximum speed difference VW_ERR is equal to or larger than a predetermined value X3; and to a larger value as the front/rear wheel maximum speed difference VW_ERR is larger when the front/rear wheel maximum speed difference VW_ERR is between a predetermined value X0 and the predetermined value X3. This setting is made with the intention of eliminating slips of the front wheels W1, W2 at an earliest possible time by increasing the value of the uncorrected launch-time LSD torque TTLSD distributed to the rear wheels W3, W4 as the front wheels W1, W2 slip at a larger degree to consequently increase the value of the launch-time LSD torque TLSD4, later described.

Next, the subroutine goes to step 52, where the 2/4 EW•ECU 11 determines whether a stop determination flag F_VSTP and a launch-time LSD torque control execution flag F_TLSD4 are both "1." The stop determination flag F_VSTP is set to "1" when the vehicle is in a stop or in a slip stop state in a launch-time torque control execution determination subroutine, later described; and to "0" when the vehicle 2 is running. Likewise, the launch-time LSD torque control execution flag F_TLSD4 is set to "1" when the launch-time LSD torque control should be conducted at the time the vehicle 2 is launched, and otherwise to "0," respectively.

When the result of determination at step 52 is YES, i.e., when the vehicle 2 is in a stop or in a slip stop state with the launch-time LSD torque control being under execution, the subroutine goes to step 53, where the 2/4 EW•ECU 11 increments a launch-time LSD torque control execution counter TM_MT2, followed by the subroutine proceeding to step 57.

On the other hand, when the result of the determination at step 52 is NO, the subroutine goes to step 54, where the 2/4 EW•ECU 11 determines whether or not the launch-time LSD torque control execution flag F_TLSD4 is "1."

When the result of the determination at step 52 is YES, i.e., when the stop determination flag F_VSPT is "0" indicating that the vehicle 2 is running with the launch-time LSD torque control under execution, from the fact that the launch-time LSD torque control execution flag F_TLSD4 is "1," like the aforementioned step 52, the subroutine goes to step 55, where the 2/4 EW•ECU 11 decrements the count value of the launch-time LSD torque control execution counter TM_MT2, followed by the subroutine proceeding to step 57.

On the other hand, when the result of the determination at step 54 is NO, i.e., when the launch-time LSD torque control execution flag F_TLSD4 is "0" indicating that the launch-time LSD torque control is not being conducted, the 2/4 EW•ECU 11 resets the count value of the launch-time LSD torque control execution counter TM_MT2 to zero, followed by the subroutine proceeding to step 57.

Next, the 2/4 EW•ECU 11 performs a limit checking operation for the launch-time LSD torque control execution counter TM_MT2 which has been set as described above. First, at step 57, the 2/4 EW•ECU 11 determines whether or not the count value of the launch-time LSD torque control execution counter TM_MT2 is larger than an upper limit value #TM_MT2. When the result of the determination at step 57 is YES, the subroutine goes to step 58, where the 2/4 EW•ECU 11 sets the launch-time LSD torque control execution counter TM_MT2 to the upper limit value #TM_MT2, followed by the subroutine proceeding to step 62.

On the other hand, when the result of the determination at step 57 is NO, i.e., TM_MT2≦#TM_MT2, the subroutine goes to step 59, where the 2/4 EW•ECU 11 determines whether or not the count value of the launch-time LSD torque control execution counter TM_MT2 is smaller than zero. When the result of the determination at step 59 is YES, the 2/4 EW•ECU 11 resets the launch-time LSD torque control execution counter TM_MT2 to zero, followed by the subroutine proceeding to step 62.

On the other hand, when the result of the determination at step 59 is NO, i.e., #TM_MT2≧MT_MT2≧0, the subroutine goes to step 61, where the 2/4 EW•ECU 11 maintains the count value of the launch-time LSD torque control execution counter TM_MT2, followed by the subroutine proceeding to step 62.

Figure 13:
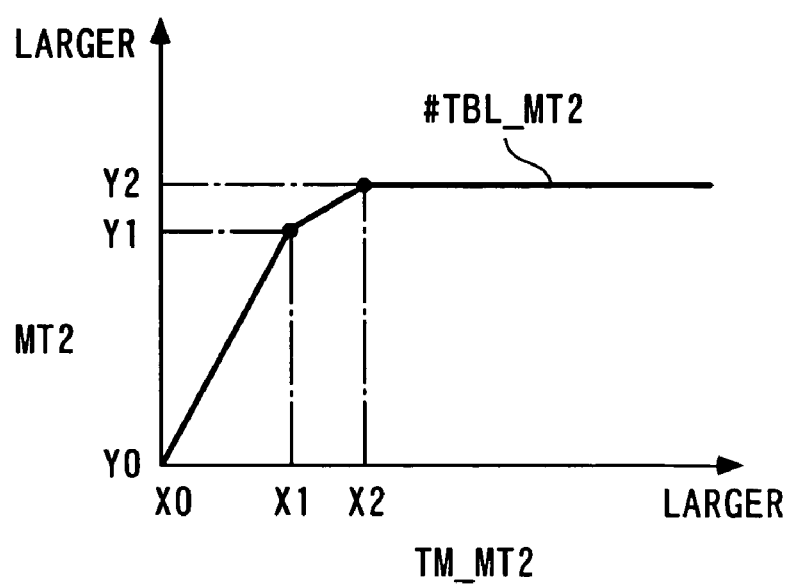
FIG. 13 is an exemplary graphic representation of a TM_MT2-MT2 table.

Subsequent to the limit checking operation at steps 57-61, the 2/4 EW•ECU 11 searches a TM_MT2-MT2 table, one example of which is shown in FIG. 13, for a table value #TBL_MT2 in accordance with the count value of the launch-time LSD torque control execution counter TM_MT2, which has been set at any of the foregoing steps 58, 60, 61, and sets the table value as a launch-time LSD torque correction value MT2.

As shown in FIG. 13, in the TM_MT2-MT2 table, the table value #TBL_MT2 is set to a predetermined value Y2 (for example, 1.5), when the count value of the launch-time LSD torque control execution counter TM_MT2 is equal to or larger than a predetermined value X2; and to a larger value as the count value of the launch-time LSD torque control execution counter TM_TM2 is larger when the count value is between a predetermined value X0 (for example, zero) and the predetermined value X2. Also, when the count value is the predetermined value X0, the table value TBL_MT2 is set to a predetermined value Y0 (for example, zero). This setting is made with the intention of gradually increasing the value of the LSD torque TLSD distributed to the rear wheels W3, W4 as the launch-time LSD torque control execution counter TM_MT2 has a larger count value, i.e., as a longer time has elapsed from the start of the launch-time LSD torque control.

Next, the subroutine goes to step 63, where the 2/4 EW•ECU 11 calculates the launch-time LSD torque TLSD4 by multiplying the uncorrected launch-time LSD torque TTLSD4 set at step 51 by the launch-time LSD torque correction value MT2 set at step 62, followed by termination of the TLSD4 calculation subroutine.

Referring next to FIG. 14, a description will be given of the VW_ERR calculation subroutine at step 50. As illustrated in FIG. 14, in this subroutine, the 2/4 EW•ECU 11 first determines at step 70 whether or not the right left wheel speed VW1 is higher than the right front wheel speed VW2. Then, when the result of the determination at step 70 is YES, the right left wheel speed VW1 is set as a representative front wheel speed VW_B1 (step 71), whereas when NO, the right front wheel speed VW2 is set as the representative front wheel speed VW_B1 (step 72). In this way, the representative front wheel speed VW_BF1 represents the higher one of the left and right front wheel speeds VW1, VW2.

Next, the 2/4 EW•ECU 11 determines at step 73 whether or not the left rear wheel speed VW3 is equal to or lower than the right rear wheel speed WV4. When the result of the determination at step 73 is YES, the left rear wheel speed WV3 is set as a representative rear wheel speed VW_BF2 (step 74), whereas when NO, the right rear wheel speed VW4 is set as the representative rear wheel speed WV_BF2 (step 75). In this way, the representative rear wheel speed WV_BF2 represents the lower one of the left and right rear wheel speeds VW3, VW4.

Next, at step 76, the 2/4 EW•ECU 11 subtracts the representative rear wheel speed VW_B2 from the representative front wheel speed VW_BL to calculate the front/rear wheel maximum speed difference VW_ERR. Specifically, the front/rear wheel maximum speed difference VW_ERR is equal to a maximum speed difference between the left and right front wheel speeds VW1, VW2 and the left and right rear wheel speeds VW3, VW4, and represents the degree of slip of the left and right front wheels W1, W2 to the left and right rear wheels W3, W4.

In this embodiment, the uncorrected launch-time LSD torque TTLSD4 is found in accordance with the front/rear maximum speed difference VW_ERR at step 51, but alternatively, the uncorrected launch-time LSD torque TTLSD4 may be found in accordance with the ratio of the representative front wheel speed VW_BF1 to the representative rear wheel speed VW_BF2 (VW_BF1/VB_BF2).

Figure 15:
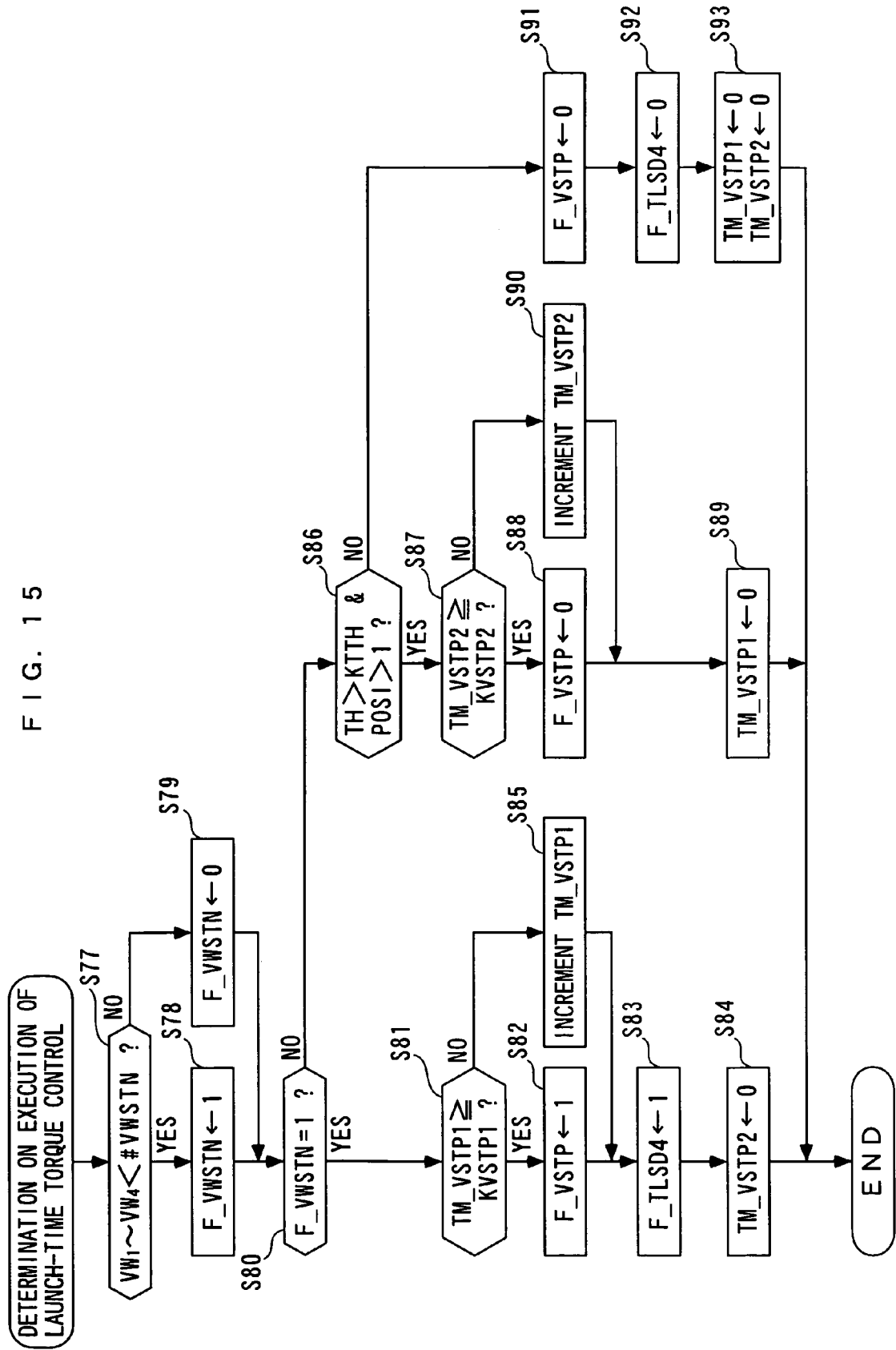
FIG. 15 is a flow chart illustrating a subroutine for determining whether to execute a launch-time torque control.

Referring next to FIG. 15, a description will be given of the launch-time torque control execution determination subroutine for setting the aforementioned stop determination flag F_VSTP and the launch-time LSD torque control execution flag F_TLSD4. This subroutine is executed at a predetermined period (for example, every one second).

As illustrated in FIG. 15, first, the 2/4 EW•ECU 11 determines at step 77 whether or not at least one of the wheel speeds VW1-VW4 of the front and rear wheels W1-W4 is lower than a predetermined speed #VWSTN (for example, 2.0 km/h) (predetermined rotational speed). When the result of the determination at step 77 is YES, the 2/4 EW•ECU 11 sets a wheel speed determination flag F_VWSTN to "1" on the assumption that the vehicle 2 is in a stop or in a slip stop state (step 78). Here, the slip stop state refers to the vehicle 2 which is to launch and has at least one of the front and rear wheels W1-W4 substantially in a stop and the remaining wheels being slipping so that the vehicle 2 cannot smoothly launch.

On the other hand, when the result of the determination at step 77 is NO, i.e., when all of the front and rear wheels W1-W4 are rotating at the rotational speeds VW1-VW4 equal to or higher than the predetermined speed #VWSTN, meaning that the vehicle 2 is running, the 2/4 EW•ECU 11 sets the wheel speed determination flag F_VWSTN to "0" (step 79).

Next, at step 80, the 2/4 EW•ECU 11 determines whether or not the wheel speed determination flag F_VWSTN is "1." When the result of the determination at step 80 is YES, i.e., when the vehicle 2 is in a stop or in a slip stop state, the subroutine goes to step 81, where the 2/4 EW•ECU 11 determines whether or not a count value of a first stop determination counter TM_VSTP1 is equal to or larger than a first predetermined value KVSTP1 (for example, corresponding to 0 msec) (first predetermined time).

When the result of the determination at step 81 is NO, i.e., TM_VSTP1<KVSTP1, the subroutine goes to step 85, where the 2/4 EW•ECU 11 increments the first stop determination counter TM_VSTP1, followed by the subroutine proceeding to step 83, later described.

On the other hand, when the result of the determination at step 81 is YES, i.e., TM_VSTP≧KVSTP1, that is, when the first predetermined time corresponding to the first predetermined value KVSTP1 has elapsed after the vehicle 2 entered in a stop or a slip stop state, the subroutine goes to step 82, where the 2/4 EW•ECU 11 sets the stop determination flag F_VSTP to "1" for indicating that the vehicle 2 is in a stop or in the slip stop state. Next, at step 83, the 2/4 EW•ECU 11 sets the launch-time LSD torque control execution flag F_TLSD4 to "1." Then, at subsequent step 84, the 2/4 EW•ECU 11 resets a second stop determination counter TM_VSTP2, later described, to zero, followed by termination of the launch-time torque control execution determination subroutine.

As described above, the stop determination flag F_VSTP is maintained at "0" until the first predetermined time has elapsed after the vehicle 2 entered in a stop state or slip stop state, and set to "1" when the first predetermined time has elapsed.

On the other hand, when the result of the determination at step 80 is NO, i.e., when the vehicle 2 is running, the subroutine goes to step 86, where the 2/4 EW•ECU 11 determines whether or not the throttle valve opening TH is equal to or larger than a predetermined value KTTH (for example, 3 deg), whether or not the POSI value is larger than one, and whether or not the shift position is other than "N," "P," and in the non-position state. When the result of the determination at step 86 is YES, i.e., when the vehicle 2 is accelerating in its running, the subroutine goes to step 87, where the 2/4 EW•ECU 11 determines whether or not the count value of the second stop determination counter TM_VSTP2 is equal to or larger than a second predetermined value KVSTP2 (for example, corresponding to 200 msec) (second predetermined time).

When the result of the determination at step 87 is NO, i.e., TM_VSTP2<KVSTP2, the subroutine goes to step 90, where the 2/4 EW•ECU 11 increments the count value of the second stop determination counter TM_VSTP2, followed by the subroutine proceeding to step 89, later described.

On the other hand, when the result of the determination at step 87 is YES, i.e., TM_VSTP2≧KVSTP2, that is, when the second predetermined time corresponding to the second predetermined value KVSTP2 has elapsed after the vehicle 2 started acceleration in its running, the subroutine goes to step 88, where the 2/4 EW•ECU 11 sets the stop determination flag F_VSTP to "0."

Next, at step 89, the 2/4 EW•ECU 11 resets the first stop determination counter TM_VSTP1 to zero, followed by termination of the launch-time torque control execution determination subroutine.

As described above, the stop determination flag F_VSTP is maintained at "1" until the second predetermined time has elapsed after the vehicle 2 exited the stop state or slip stop state, and is set to "0" when the second predetermined time has elapsed.

On the other hand, when the result of the determination at step 86 is NO, i.e., when the front and rear wheels W1-W4 are all rotating at the wheel rotational speeds VW1-VW4 equal to or higher than the predetermined speed #VSWTN, and when the throttle valve opening TH is equal to or smaller than the predetermined value KTTH or when the shift position is either "N" or "P," or in the non-position state, the 2/4 EW•ECU 11 resets the stop determination flag F_VSTP and the launch-time LSD torque control execution flag F_TLSD4 to "0" at steps 91 and 92, respectively, and resets both the first and second stop determination counters TM_VSTP1, TM_VSTP2 to zero (step 93), followed by termination of the launch-time torque control execution determination subroutine.

Next, a description will be given of the aforementioned TLSD addition/subtraction subroutine executed at step 14 in FIG. 3. In this subroutine, the 2/4 EW•ECU 11 calculates the LSD torque TLSD by the following equation (2) based on the LSD torque target value TLSDM calculated at the aforementioned step 11.

$$TLSD = TLSD0 + KDTLSD \times KVTLSD \times DTLSD \quad (2)$$

where DTLSD is the difference between the LSD torque target value TLSDM and the preceding value TLSD0 of the LSD torque TLSD (=TLSDM−TLSDM0). In this way, in the equation (2) above, the second term on the right side KDLSD×KVTLSD×DTLSD is calculated in accordance with the difference DTLSD, and is added to or subtracted from the preceding value TLSD0.

Figure 16:
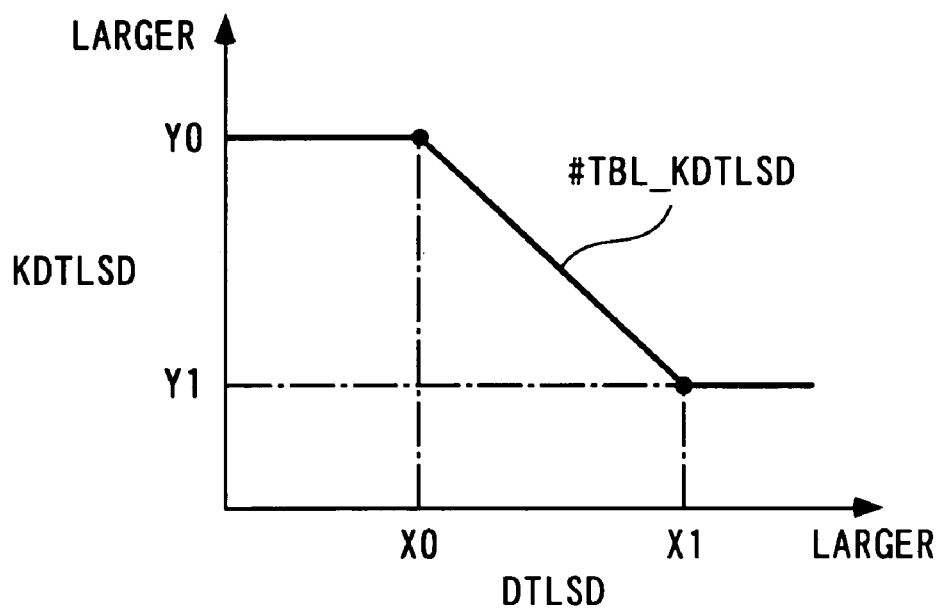
FIG. 16 is an exemplary graphic representation of a DTLSD-KDTLSD table.

Further, the first addition/subtraction adjusting coefficient KDTLSD in the foregoing equation (2) is set to a table value #TBL_KDTLSD found by searching a DTLSD-KDTLSD table, one example of which is shown in FIG. 16, in accordance with the difference DTLSD. As shown in FIG. 16, the table value #TBL_KDTLSD is set to a predetermined value Y0 (for example, 1.0) when the difference DTLSD is equal to or smaller than a predetermined value X0; to a predetermined value Y1 smaller than the predetermined value Y0 when the difference DTLSD is equal to or larger than a predetermined value X1; and to a linearly smaller value as the difference DTLSD is larger when the difference DTLSD is between the predetermined value X0 and the predetermined value X1. This setting is made with the intention of preventing a torque step which becomes larger as the difference DTLSD is larger.

Also, there are two types of DTLSD-KDTLSD tables provided for the positive and negative differences DTLSD, respectively. In these DTLSD-KDTLSD tables, the table value #TBL_KDTLSD are set to values in a similar tendency but different from each other.

Figure 17:
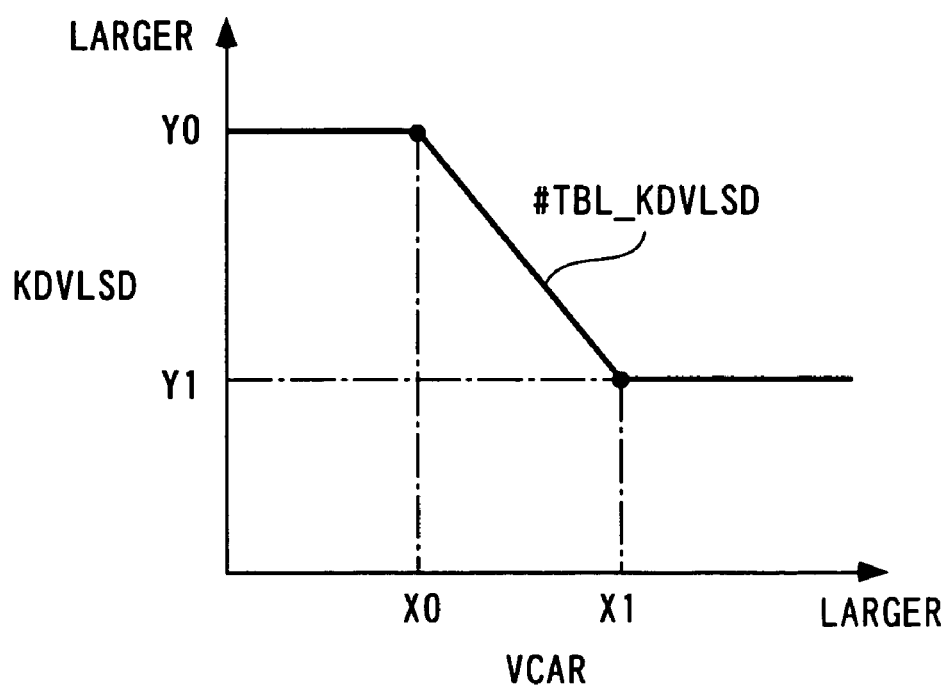
FIG. 17 is an exemplary graphic representation of a VCAR-KVTLSD table.

Further, the second addition/subtraction adjusting coefficient KVTLSD in the aforementioned equation (2) is set to a table value #TBL_KVTLSD which is found by searching a VCAR-KVTLSD table, one example of which is shown in FIG. 17, in accordance with the vehicle speed VCAR. As shown in FIG. 17, the table value #TBL_KVTLSD is set to a predetermined value Y0 (for example, 1.0) when the vehicle speed VCAR is equal to or higher than a predetermined value X0; to a predetermined value Y1 smaller than the predetermined value Y0 when the vehicle speed VCAR is equal to or higher than the predetermined value X1; and to a linearly smaller value as the vehicle speed VCAR is higher when the vehicle speed is between the predetermined values X0 and X1. This setting is made with the intention of preventing a torque step which becomes larger as the vehicle speed VCAR is higher.

According to the driving force control apparatus 1 as described above, the vehicle 2 is determined to be in a stop or in a slip stop state when at least one of the front and rear wheels W1-W4 is rotating at the wheel speeds VW1-VW4 equal to or lower than the predetermined speed #VWSTN (YES at step 80). When the vehicle 2 is in the slip stop state, the electromagnetic clutches 10 are corrected for the fastening force TLSD by the launch-time LSD torque TLSD4 calculated at step 63. In this way, a larger torque is distributed for transmission to the rear wheels W3, W4 to eliminate a slipping state of the front wheels W1, W2, thereby making it possible to launch the vehicle 2 without fail even on either a road with a uniform surface resistance μ or a split road.

When at least one of the front and rear wheels W1-W4 are rotating at the speeds VW1-VW4 equal to or lower than the predetermined speed #VWSTN, the vehicle 2 is not immediately determined to be in the slip stop state, but the vehicle 2 is definitely determined to be in the slip stop state (step 82) only when the wheel speed remains equal to or lower than the predetermined speed #VWSTN until the count value of the first stop determination counter TM_VSTP1 reaches the first predetermined value KVSTP1, i.e., for the first predetermined time (YES at step 81). In this way, the torque distributed to the rear wheels W3, W4 is increased when the vehicle 2 is definitely in the slip stop state, the vehicle 2 can be launched with stability while preventing the hunting of the control.

Also, the determination is maintained to be made that the vehicle 2 is in a slip stop state until the count value of the second stop determination counter TM_VSTP2 reaches the second predetermined value KVSTP2 (YES at step 87), i.e., until the second predetermined time has elapsed from the time the front and rear wheels W1-W4 are rotating at their respective wheel speeds VW1-VW4 all exceeding the predetermined speed #VWSTN so that the vehicle 2 is determined not to be in the slip stop state, and the vehicle 2 is running with acceleration (NO at step 81 and YES at step 86) after the vehicle was determined to be in the slip stop state. In this way, the vehicle 2 is definitely determined that it has exited the slip stop state only after the vehicle 2 has exited the slip stop state without fail (step 88), thereby making it possible to prevent the hunting of the control.

Also, when the vehicle 2 is in the slip stop state with the launch-time LSD torque control under execution (YES at step 52), the count value of the launch-time LSD torque control execution counter TM_MT2 is incremented (step 53). Then, as the count value is larger, i.e., as a longer time has elapsed from the start of the launch-time LSD torque control in response to the definite determination of the vehicle 2 in the slip stop state, the uncorrected launch-time LSD torque TTLSD4 is corrected to a larger launch-time LSD torque TLSD4. Therefore, the torque distributed to the rear wheels W3, W4 can be gradually increased in response to an increase in the count value of the launch-time LSD torque control execution counter TM_MT2, so that the vehicle 2 can be smoothly launched even when a larger torque is required for launching, as on a gradient road, while preventing a sudden change in the distributed torque.

On the other hand, the launch-time LSD torque control is continuously conducted until the vehicle 2 is determined to be running with deceleration (NO at step 86) even after the vehicle 2 has exited the slip stop state, in which case the count value of the launch-time LSD torque control execution counter TM_MT2 is decremented (step 55). Then, as the count value is smaller, i.e., as a longer time has elapsed after a definite determination was made that the vehicle 2 had exited the slip stop state, the uncorrected launch-time LSD torque TTLSD4 is corrected to a smaller launch-time LSD torque TLSD4. Thus, the torque distributed to the rear wheels W3, W4 can be gradually reduced in response to a decrease in the count value of the launch-time LSD torque control execution counter TM_MT2, so that the vehicle 2 can be smoothly run, even immediate after the vehicle 2 has exited the slip stop state, while preventing a sudden change in the distributed torque.

It should be understood that the present invention is not limited to the embodiment described above, but can be practiced in a variety of manners. For example, the present invention is not limited to four-wheel drive vehicles, but can be applied to a variety of industrial vehicles having main driving wheels and sub-driving wheels, as a matter of course. Otherwise, details in configuration can be modified as appropriate without departing from the scope of the invention as defined in the appended claims.

What is claimed is:

1. A driving force control apparatus for a four-wheel drive vehicle configured to transmit a driving force of a prime mover directly to a left and a right main driving wheel and to a left and a right sub-driving wheel through a clutch, said apparatus comprising:

a rotational speed detecting means for detecting a rotational speed of each of said main driving wheels and said sub-driving wheels;

a fastening force setting means for setting a fastening force of said clutch in accordance with a difference between the detected rotational speeds of said main driving wheels and said sub-driving wheels;

a slip stop state determining means for determining that said four-wheel drive vehicle is in a slip stop state when at least one of the detected rotational speeds of said wheels is equal to or lower than a predetermined rotational speed;

a fastening force correcting means for correcting the fastening force of said clutch set by said fastening force setting means when said slip stop state determining means determines that said four-wheel drive vehicle is in the slip stop state; and a counting means for counting the number of times said slip stop state determining means determines that said four-wheel drive vehicle is in the slip stop state, wherein said slip stop state determining means determines that said four-wheel drive vehicle is in the slip stop state when at least one wheel is rotating at a rotational speed equal to or lower than the predetermined rotational speed for a first predetermined time or longer, and wherein said fastening force correcting means corrects said clutch for the fastening force in accordance with the counted count value.

2. A driving force control apparatus for a four-wheel drive vehicle according to claim 1, wherein said slip stop state determining means determines that said four-wheel drive vehicle has exited the slip stop state when all of said main driving wheels and said sub-driving wheels are rotating at rotational speeds exceeding the predetermined rotational speed for a second predetermined time or longer after said four-wheel drive vehicle is determined to be in the slip stop state.

* * * * *